United States Patent [19]

Chernotsky et al.

[11] Patent Number: 4,465,965
[45] Date of Patent: Aug. 14, 1984

[54] POWER LIMITING APPARATUS

[76] Inventors: Alan Chernotsky, 36 Lakeshore Dr., Rockaway, N.J. 07866; Richard Satz, 20 Cedar La., Succasunna, N.J. 07876

[21] Appl. No.: 310,879

[22] Filed: Oct. 26, 1981

[51] Int. Cl.³ .............................................. G05F 1/10
[52] U.S. Cl. .................................... 323/239; 323/241; 323/323; 307/35; 307/62
[58] Field of Search ............... 323/239, 241, 282, 283, 323/300, 320–325, 349–351; 307/22, 24, 26, 35, 48, 62, 66; 361/211; 236/46 R, 46 A, 46 B, 46 C

[56] References Cited

U.S. PATENT DOCUMENTS

| | | | |
|---|---|---|---|
| 3,659,114 | 4/1972 | Polenz et al. | 307/52 |
| 3,714,453 | 1/1973 | Delisle et al. | 307/39 |
| 3,970,861 | 7/1976 | McCollum | 307/35 |
| 4,060,709 | 11/1977 | Hanson | 307/62 X |
| 4,090,107 | 5/1978 | Seib | 323/322 X |
| 4,272,687 | 6/1981 | Borkan | 307/115 |

Primary Examiner—Peter S. Wong
Attorney, Agent, or Firm—Lerner, David, Littenberg, Krumholz & Mentlik

[57] ABSTRACT

Apparatus can limit power by limiting the duty cycle of current carried by a pair of lines. The lines intermittently conduct electrical power. The apparatus has a clock, a converter and a switch system. The clock can provide a timing signal. The converter is driven by the lines and can convert its intermittent electrical signals to uninterrupted power and can supply this uninterrupted power to the clock. The switch system responds to the timing signal and can periodically interrupt at least one of the lines.

16 Claims, 2 Drawing Figures 4,465,965

POWER LIMITING APPARATUS

BACKGROUND OF THE INVENTION

The present invention relates to power limiting apparatus and, in particular, to equipment for establishing a duty cycle scaled to correspond with the measurement cycle of a peak demand meter.

It is known to reduce the duty cycle of power supplied to an air conditioning system to reduce the peak demand required from utility lines. However, these systems have not considered the advantage of scaling the repetition rate of the switching to complement a peak demand meter. Such a peak demand meter measures over successive intervals of a predetermined duration the highest amount of energy consumed during the intervals. The highest energy demanded during these intervals is used by the utility to set the billing rate to the consumer. Unfortunately, a consumer who uses very little energy overall but occasionally requires a high peak power input may be billed at a substantially higher rate than heavier users.

Known demand limiting systems generally require a continual potential across the affected lines for proper operation. Therefore, these known systems cannot be connected into a pair of lines that run to the thermostatic switch of an air conditioning system. When the thermostatic switch is closed, there is no potential across the associated lines and, therefore, no potential is present for driving this demand limiting system.

Accordingly, there is a need for a simple and effective system which limits the peak power demands measured by a given demand meter and which can be connected to various points in the load circuit.

SUMMARY OF THE INVENTION

In accordance with the illustrative embodiments demonstrating features and advantages of the present invention, there is provided apparatus for limiting power by limiting the duty cycle of current carried by a pair of lines. These lines intermittently conduct electrical power. The apparatus has a clock means for providing a timing signal and a switch means. Also included is a conversion means driven by the lines for converting its intermittent electrical signals to uninterrupted electrical power and supplying it to the clock means. The switch means can respond to the timing signal and can periodically interrupt at least one of the lines.

According to a related method of the present invention, the power demand through a pair of lines supplied by a peak demand meter is reduced. This peak demand meter can record the highest amount of energy consumed during successive intervals, each interval having a predetermined duration. The method includes the step of supplying energy to a clock by connecting it across the lines. Another step is opening a given one of the lines for a portion of the predetermined duration as measured by the clock. The method also includes the step of reclosing the given one of the lines for the remainder of the predetermined duration as measured by the clock.

In a related embodiment also according to the present invention, apparatus for limiting power delivered from power lines through a peak demand meter includes a clock means and a switch means. This meter can record the highest amount of average power consumed during successive time intervals, each interval having a predetermined duration. The clock means provides a periodic timing signal to the switch means. The switch means is serially connected with the power lines to periodically interrupt current from the power lines with a period proportional to the period of the periodic timing signal. The period of the switch means is about as long as the predetermined duration.

By employing apparatus and methods of the foregoing type, the peak demand logged against a consumer can be reduced drastically. In one embodiment where a peak demand meter measures average power consumed over a fifteen minute interval, a switch interrupts the power to a load every fifteen minutes to produce a 50% duty cycle. The peak power demand in this embodiment was therefore reduced by 50%, if the load would have been powered throughout the fifteen minute intervals.

In the situation where the load is an air conditioning unit, it has been found that periodic interruption does not necessarily reduce the comfort provided by the air conditioner. This is because usually an air conditioning unit remains on for a relatively long interval followed by a relatively long off interval. Essentially, the preferred embodiment of the invention redistributes the relatively long off and on intervals into a series of short on (e.g. 7½ minute) intervals followed by a short off interval. Of course, the specific duration can be lengthened or shortened depending upon the application. Consequently, the overall cooling effect remains the same except that now the air conditioning unit works on a more rapidly repeating duty cycle. As a result of the foregoing, the consumer pays for power demanded at a greatly reduced rate.

A significant advantage of the present invention is that it can operate on virtually any of the lines controlling or powering the load. Consider a pair of lines to a thermostatic switch which when the switch is closed has zero potential across them. In a preferred embodiment, a battery system is charged when the thermostatic switch is open so that an energizing potential can be produced from the battery even when the thermostatic switch subsequently closes. Preferably, the battery used is a nickel-cadmium battery having a continuous charge capability so inadvertent damage is avoided. In addition, the battery can be so connected that when the main breaker is open to cease powering the load (for example, during winter months when air conditioning is not used) the battery can slowly discharge and deactivate the power limiting apparatus without a detrimental effect. This battery can discharge to a value below which the integrated circuitry driven by the battery ceases to draw current. Accordingly, the battery is never discharged to zero volts which helps to promote the long life of the battery.

In one embodiment, a pulse generator drives a divider to cycle a triac on and off every fifteen minutes. This triac is in the thermostatic circuit of an air conditioning system. In other embodiments, however, the triac can either control the current directly delivered to a load or current delivered to a relay controlling the load current. Alternatively, the triac controls a larger triac which in turn drives a coil operating a high current contactor.

BRIEF DESCRIPTION OF THE DRAWINGS

The above brief description as well as other objects, features and advantages of the present invention will be more fully appreciated by reference to the following detailed description of the presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
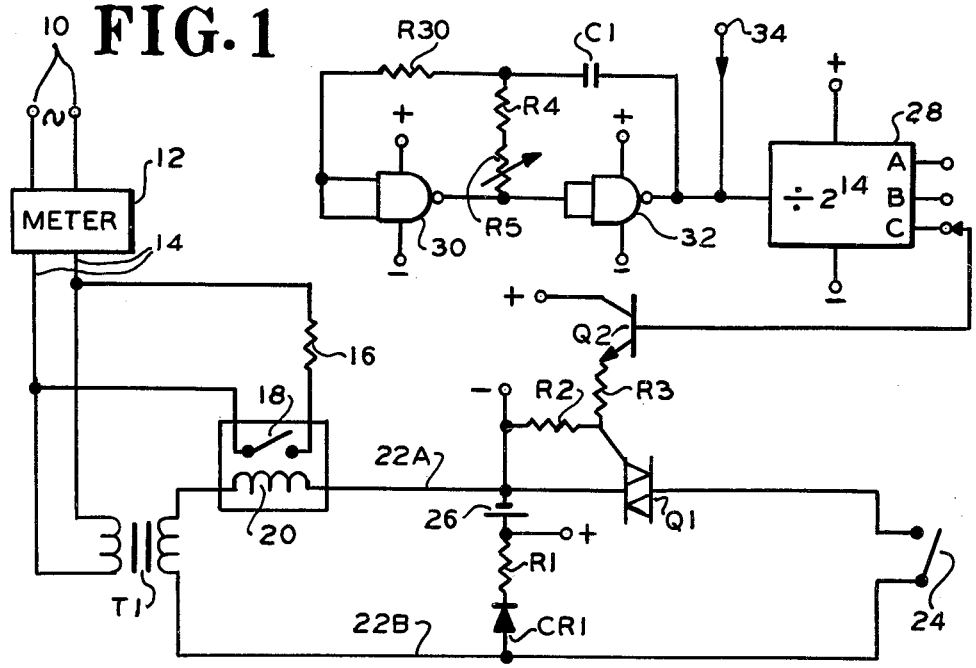
FIG. 1 is a schematic diagram of apparatus according to the principles of the present invention.

Referring to FIG. 1, the illustrated apparatus can limit power delivered from power lines 10 through peak demand meter 12. Peak demand meter 12, in this embodiment, measures the amount of average power drawn from utility lines 10 during successive time intervals of a predetermined duration. Peak demand meter 12 records the highest amount of average power consumed during those successive time intervals, e.g. each ¼ hour the largest measurement thus made is defined by the utility as the peak demand of the consumer from utility lines 10. This peak demand together with the billing rate establishes the cost for demand wattage: the higher the peak demand, the higher the cost. Pair of lines 14 from meter 12 connect to the primary of transformer T1 and the series combination of load 16 and relay contacts 18. Load 16, in this embodiment, is an air conditioning unit, however, it will be appreciated that the load may be any electrical energy consuming device. The secondary of transformer T1 is serially connected with another load, in this embodiment, relay coil 20 which operates contacts 18. The serial combination of the secondary of transformer T1 and relay coil 20 connects across a pair of lines identified herein as lines 22A and 22B. Line 22A connects to the main electrode of a switching means shown herein as bidirectional current conducting device Q1. Its other main electrode connects to one terminal of thermostatic switch 24, whose other terminal connects to line 22B. Thus connected, device Q1, in this embodiment, is a triac which can complete the circuit from the secondary of transformer T1 through thermostatic switch 24 to the relay coil 20. It will be appreciated, however, that for some embodiments relay coil 20 (or switch 24) may be eliminated and switch 24 (or coil 20) is replaced with a load circuit. This load circuit could be any energy consuming device which is operable at a reduced duty cycle. Alternatively, the position of relay coil 20 can be transposed with thermostatic switch 24 to produce a functionally equivalent circuit.

A battery means is shown herein as nickel-cadmium battery 26. The negative terminal of battery 26, identified by a terminal bearing a negative symbol, connects to similarly identified terminals in this schematic as well as to line 22A. The positive terminal of battery 26, identified by a terminal bearing a positive symbol, connects to similarly identified terminals in this schematic. Resistor R1 connects between the positive terminal of battery 26 and the cathode of diode CR1, whose anode connects to line 22B. Resistor R2 is connected between line 22A and the gate electrode of triac Q1. Resistor R3 connects between this gate electrode and the emitter of NPN transistor Q2, whose collector is connected to the previously mentioned positive battery terminal and whose base is connected to a clock means. This clock means is, in this embodiment, the balance of the illustrated circuitry and includes a divider 28, having a plurality of output terminals A, B and C. Those output terminals are part of a selection means whereby the base of transistor Q2 can be connected to any of the output terminals. In this embodiment, divider 28 can divide incoming pulses by a maximum factor of $2^{14}(16,384)$. Terminal C, to which the base of transistor Q2 is presently connected, provides this maximum division which form an 18.2 Hertz oscillator input, provides an output cycle of 900 seconds.

A pulse generator is shown herein as a pair of logic gates, NAND gates 30 and 32. The output of NAND gate 30 connects to both inputs of NAND gate 32, whose output connects to one terminal of capacitor C1. Its other terminal connects to one terminal of resistor R30, whose other terminal connects to both inputs of NAND gate 30. The series combination of resistor R4 and variable resistor R5 connects between the output of NAND gate 30 and the junction of resistor R30 and capacitor C1. The output of NAND gate 32 is identified as an input test terminal 34. NAND gate 30 and 32 as well as divider 28, receive power from battery 26 as indicated by the positive and negative terminals leading to them. Terminal 34 is the input of divider 28.

Figure 2:
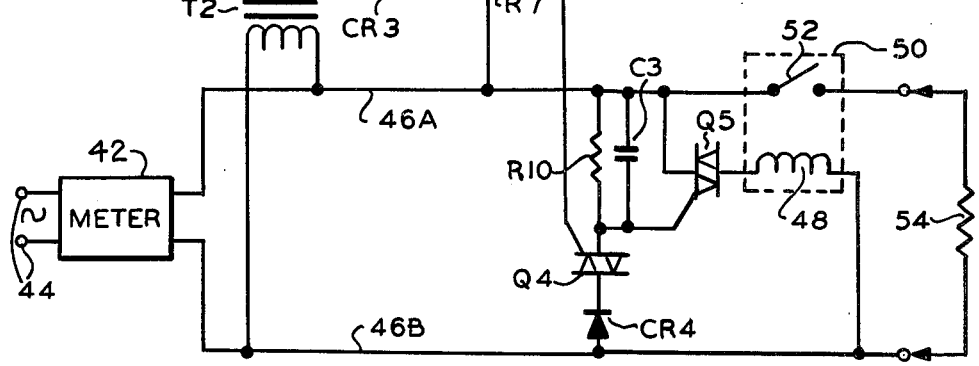
FIG. 2 is a schematic diagram of an embodiment which is an alternate to that of FIG. 1.

Referring to FIG. 2, identically labeled elements are the same components connected in the same manner as previously described. Again, output C of divider 28 connects to the base of transistor Q2 to drive that transistor. Serially connected between the negative terminal and the emitter of transistor Q2 is the series combination of resistors R7 and R6. This negative terminal is again a negative battery terminal for battery 40, whose positive terminal connects to one lead of the secondary of transformer T2, its other lead connecting to the cathode of diode CR3. Resistor R8 connects between the negative terminal of battery 40 and the anode of diode CR3. Connected in parallel with the primary of transformer T2 are the output lines, lines 46A and 46B of peak demand meter 42, whose input lines connect to utility lines 44. Line 46A connects to the negative terminal of battery 40 and to one terminal of resistor R10, whose other terminal connects to one main terminal of switching device Q4, its other main terminal connecting to the cathode of diode CR4. Capacitor C3 is connected in parallel with resistor R10. The anode of diode CR4 connects to line 46B. The gate of switching device Q4 (in this embodiment, a triac) connects to the junction of resistors R6 and R7. A semiconductor switch, shown herein as triac Q5, has its trigger electrode connected to the junction of triac Q4 and resistor R10. Line 46A connects to one switching electrode of triac Q5, its other switching electrode connecting to one terminal of relay coil 48, whose other terminal connects to line 46B. Coil 48 is part of relay 50 and drives relay contacts 52 which connect between line 46A and one terminal of load 54, whose other terminal connects to line 46B.

To facilitate an understanding of the principles associated with the foregoing apparatus, its operation will be briefly described. Referring first to FIG. 1, it will be presumed that thermostatic switch 24 opens (and closes) regularly so that potential supplied from utility lines 10 through the secondary of transformer T1 produce a pulsating current through resistor R1 and diode CR1 tending to charge nickel-cadmium battery 26. Consequently, its positive and negative terminals have across them a predetermined potential. Due to the blocking action of diode CR1, this potential persists even though switch 24 may subsequently close.

Therefore, an energizing potential is applied to the clock comprising divider 28 and NAND gates 30 and 32. Since positive feedback is provided by resistor R3 and capacitor C1, NAND gates 30 and 32 oscillate. The frequency of this oscillation can be adjusted by variable resistor R5 in a conventional fashion. This adjustment is set to produce a pulse train at terminal 34 having a repetition rate of 18 Hertz. This 18 Hertz signal is divided by binary divider 28 by the factor $2^{14}$. Consequently, the output produced on terminal C has a period of approximately fifteen minutes, 7.5 minutes on and 7.5 minutes off. It will be appreciated, of course, that this period can be altered and its duty cycle varied depending upon the specific application. The selected output terminal of divider 28 can be changed to reduce that period of fifteen minutes by one half or one quarter, or any division of 2, as desired.

Selected output C of divider 28 renders transistor Q2 alternatively conductive and nonconductive from its collector to its emitter. Consequently, the voltage between the gate electrode of triac Q1 and line 22A alternates from positive to zero potential, rendering triac Q1 alternately conductive and nonconductive, respectively.

It is now assumed that thermostatic switch 24 closes. Therefore, triac Q1 is able to conduct through actuated switch 24 at a period and duty cycle determined by divider 28. Therefore, current flows through relay coil 20 at a 50% duty cycle, cycling every fifteen minutes. As a result, air conditioning load 16 operates for 7½ minutes and is then disabled for 7½ minutes. It is recommended that for air conditioning loads the off period be reasonably long so the compressors can discharge refrigerant that may be temporarily trapped in the compression chamber of the compressor. An attempt to operate the compressor before the refrigerant has discharged will cause an excessive load on the compressor piston which can fatique or break it.

As a result of the foregoing, current is supplied to air conditioning load 16 from peak demand meter 12 for only one half of its time measurement interval of fifteen minutes. Therefore, the peak load measured by meter 12 is half of what would have been measured in the absence of the apparatus of FIG. 1.

The operation of the apparatus of FIG. 2 is similar, divider 28 producing pulses which alternately render transistor Q2 conductive and nonconductive. In this embodiment, transformer T2 is provided primarily to maintain the charge on battery 40 through resistor R8 and diode CR3.

Since transistor Q2 is alternately conductive and nonconductive, it alternates the gate of triac Q4 between a positive or zero potential with respect to its main electrode connected to resistor R10. Consequently, triac Q4 conducts at a 50% duty cycle over a period of fifteen minutes. This produces a pulsating positive voltage across resistor R10 which renders triac Q5 conductive at a 50% duty cycle having a period of fifteen minutes. As a result, a circuit is periodically made through triac Q5 from the output terminals of meter 42 through relay coil 48. Consequently, relay contacts 52 cycle every fifteen minutes at a 50% duty cycle. Therefore, load 54 is also energized at a 50% duty cycle with a fifteen minute period. Therefore as before, peak demand meter 42 reads a peak demand which is only half of what would be read in the absence of the apparatus of FIG. 2.

It is to be appreciated that various modifications may be implemented with respect to the above described preferred embodiments. For example, in systems requiring or allowing the switching of direct current voltages, thyristors or other types of switching devices may be substituted for the illustrated triacs. Furthermore, various types of loads can be switched and for loads that need not remain off for a minimum period of time, the repetition rate may be substantially increased. In addition, some embodiments may use a duty cycle differing from 50%. For thermostatically controlled embodiments, the apparatus can be inserted into the lines leading to either: the thermostat, the utility lines or the relay coil operated by the thermostat. In other embodiments, the apparatus may be inserted in a line running directly from the utility lines to the load. While a nickel-cadmium battery is illustrated, other batteries may be employed in different embodiments. Also instead of integrated circuitry, discrete circuits may be used. Moreover, various components may be substituted for the illustrated components depending upon the desired power, speed, temperature stability, size, permissible heating, accuracy, etc. It is also anticipated that to avoid the effect of humidity or corrosive effects, the circuit may be mounted on a printed circuit board and completely encapsulated in polyurethane. It is also noted that for test purposes, a high frequency signal may be injected into the input of the divider to cause it to cycle much more rapidly then designed, thereby reducing the test time.

Obviously, many modifications and variations of the present invention are possible in light of the above teachings. It is therefore to be understood that within the scope of the appended claims, the invention may be practiced otherwise than as than specifically described.

What is claimed is:

1. Apparatus for controlling measured power consumed by a load by regulating the duty cycle of power carried by a pair of lines to which said load is to be connected, said power being measured as an average over a fixed interval and said lines intermittently conducting electrical power, said apparatus comprising:
   clock means for providing a timing signal having a duration corresponding to a fractional portion of said fixed interval, said clock means providing at least one timing signal during said such interval;
   conversion means driven by said lines for converting intermittent electrical signals thereon to uninterrupted electrical power and supplying said uninterrupted power to said clock means; and
   switch means responsive to said timing signal for supplying power to a load connected to said lines only during said fractional portion of said fixed interval during which said timing signal is present to establish a desired duty cycle for said load as a function of the manner in which power is measured.

2. Apparatus according to claim 1 wherein said conversion means comprises:
   energy storage means driven by said lines for storing electrical energy and supplying it to said clock means.

3. Apparatus according to claim 2 wherein said lines have between them substantially zero potential when they are conducting load current and wherein said storage means is operable to store electrical energy when said lines are interrupted by said switch means, said storage means being operable to supply electrical energy to said clock means either when said load current is flowing or is interrupted by said switch means.

4. Apparatus according to claim 2 wherein said storage means includes a battery.

5. Apparatus according to claim 4 wherein said switch means is cycled once every fifteen minutes for supplying power to said load for 7.5 minutes, to provide a 50% duty cycle for said load.

6. Apparatus according to claim 1 wherein said lines carry alternating current and wherein said switch means comprises a bidirectional current conducting device having a gate electrode and a pair of main electrodes, said gate electrode being coupled to said clock means.

7. Apparatus according to claim 6 wherein said clock means comprises:
   a pulse generator; and
   a divider driven by said generator for producing a square wave signal at a frequency proportional to and lower than the repetition rate of said pulse generator.

8. Apparatus according to claim 6 wherein said divider has a plurality of output terminals each producing a signal having a different frequency, said switch means having:
   selection means for connecting said switch means to any one of said plurality of output terminals whereby the duration of said timing signal provided by said switch means is rendered adjustable, enabling selection of a desired duty cycled for said load.

9. Apparatus according to claim 6 wherein said switch means includes:
   a relay coil serially connected with said main electrodes of said bidirectional device.

10. Apparatus according to claim 6 wherein said switch means comprises:
    a switching device having a pair of main electrodes and a gate electrode, the latter being connected to said clock means; and
    a semiconductor switch having a pair of switched electrodes and a trigger electrode, the latter being connectdd to one of said main electrodes of said switching device.

11. Apparatus according to claim 10 wherein said switch means includes:
    a relay coil serially connected with said switched electrodes of said semiconductor switch.

12. Apparatus according to claim 1, wherein said clock means comprises:
    means for generating a series of pulses in a predetermined manner; and
    means for dividing said pulses in a predetermined manner, said means for dividing including adjustable switch means and a plurality of output terminals, each said output terminal producing a timing signal having a duration corresponding to a different fractional portion of said fixed interval, said adjustable switch means selectively coupling a selected one of said output terminals to said switch means.

13. Apparatus according to claim 12, wherein said means for generating comprises a pair of logic gates having a positive feedback means coupled to input and output terminals thereof for causing said gates to function as a controlled pulse generator.

14. Apparatus according to claim 8 wherein said pulse generator comprises:
    a pair of logic gates connected via means for providing positive feedback between input and output terminals thereof, thereby causing said gates to function as a controlled pulse generator.

15. A method for reducing measured power consumed by a load to be connected to a pair of lines to which power is supplied, said power being measured as an average over a fixed interval, comprising the steps of:
    providing timing signals during each such fixed interval from a clocking source, said timing signals having a duration corresponding to a fractional portion of said fixed interval;
    switching power from said pair of lines to said load as a function of said timing signals to establish a duty cycle for said load during each fixed interval corresponding to said fractional portion of said fixed interval;
    converting switched power from said pair of lines to uninterrupted electrical power; and
    applying converted uninterrupted electrical power to said clocking source.

16. A method according to claim 15 wherein at least one of said lines connect to a switch, further comprising the steps of:
    storing electrical energy from said lines when said switch is open, for supplying energy to said clocking source in the absence of electrical energy from said lines.

* * * * *

UNITED STATES PATENT AND TRADEMARK OFFICE
CERTIFICATE OF CORRECTION

PATENT NO. : 4,465,965
DATED : August 14, 1984
INVENTOR(S) : Alan Chernotsky et al It is certified that error appears in the above-identified patent and that said Letters Patent are hereby corrected as shown below:

Column 4, line 8, "form" should read --from--.

Column 7, line 30, "cycled" should read --cycle--.

Column 7, line 36, "claim 6" should read --claim 1--.

Column 7, line 43, "connectdd" should read --connected--.

Column 8, line 45, "steps" should read --step--.

Signed and Sealed this

Twelfth Day of March 1985

[SEAL]

Attest:

DONALD J. QUIGG

Attesting Officer    Acting Commissioner of Patents and Trademarks